(12) United States Patent
Shimizu et al.

(10) Patent No.: US 11,453,360 B2
(45) Date of Patent: Sep. 27, 2022

(54) AIR-BAG APPARATUS

(71) Applicant: HONDA MOTOR CO., LTD., Tokyo (JP)

(72) Inventors: Takayuki Shimizu, Wako (JP); Hiroyuki Ito, Wako (JP); Takashi Saso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/752,704

(22) Filed: Jan. 27, 2020

(65) Prior Publication Data
US 2020/0290551 A1    Sep. 17, 2020

(30) Foreign Application Priority Data
Mar. 12, 2019   (JP) .............................. JP2019-045092

(51) Int. Cl.
*B60R 21/231*    (2011.01)
*B60R 21/015*    (2006.01)
(Continued)

(52) U.S. Cl.
CPC ............ *B60R 21/231* (2013.01); *B60N 2/427* (2013.01); *B60R 21/015* (2013.01);
(Continued)

(58) Field of Classification Search
CPC ............ B60R 21/231; B60R 21/01552; B60R 21/015; B60R 21/207; B60R 21/20; B60R 21/2334; B60R 21/2338; B60R 2021/161; B60R 2021/01238; B60R 2021/2074; B60R 2021/0048; B60R 2021/23107; B60R 2021/23382; B60R 2021/23384; B60R 2021/23386; B60R 2021/23388; B60R 2021/0044; B60R 2021/0004; B60R 2021/0058; B60R 2021/0032;
(Continued)

(56) References Cited

U.S. PATENT DOCUMENTS

| 3,953,049 | A |   | 4/1976 | Surace et al. |
| 5,390,952 | A | * | 2/1995 | Goor ...................... B60R 21/01 |
|           |   |   |        | 280/730.1 |

(Continued)

FOREIGN PATENT DOCUMENTS

| CN | 104039603 | 9/2014 |
| CN | 108688606 | 10/2018 |

(Continued)

OTHER PUBLICATIONS

Chinese Office Action for Chinese Patent Application No. 202010080437.6 dated Jan. 25, 2022.
Japanese Office Action for Japanese Patent Application No. 2019-045092 dated Apr. 12, 2022.
Chinese Office Action for Chinese Patent Application No. 202010080437.6 dated Jun. 7, 2022.

*Primary Examiner* — Keith J Frisby
(74) *Attorney, Agent, or Firm* — Amin, Turocy & Watson, LLP

(57) ABSTRACT

An air-bag apparatus includes: a frame member that is tiltable along a seat back of a vehicle seat; and a bag body that is embedded in the frame member, that is inflated and expanded to a front of an occupant seated on the vehicle seat at a time of an impact input, and that prevents a body of the occupant from being separated from the seat back.

6 Claims, 4 Drawing Sheets

(51) Int. Cl.
  *B60R 21/207* (2006.01)
  *B60N 2/427* (2006.01)
  *B60R 21/16* (2006.01)
  *B60R 21/01* (2006.01)
  *B60R 21/00* (2006.01)

(52) U.S. Cl.
  CPC ...... *B60R 21/01552* (2014.10); *B60R 21/207* (2013.01); *B60R 2021/0032* (2013.01); *B60R 2021/0048* (2013.01); *B60R 2021/01238* (2013.01); *B60R 2021/161* (2013.01); *B60R 2021/2074* (2013.01)

(58) Field of Classification Search
  CPC . B60R 2021/26058; B60R 2021/01211; B60R 2021/01225; B60N 2/427; B60N 2/0232; B60N 2/02; B60N 2/22; B60N 2/68; B60N 2/42745
  USPC .................................. 280/730.1, 728.1, 753
  See application file for complete search history.

(56) References Cited

U.S. PATENT DOCUMENTS

| | | | |
|---|---|---|---|
| 8,845,029 B2* | 9/2014 | Voelz | B60N 2/2356 |
| | | | 297/362.11 |
| 2013/0015642 A1 | 1/2013 | Islan et al. | |
| 2017/0057459 A1 | 3/2017 | Kondo et al. | |
| 2018/0194317 A1 | 7/2018 | Barbat et al. | |
| 2018/0236962 A1 | 8/2018 | Ohno et al. | |
| 2018/0281724 A1* | 10/2018 | Nagasawa | B60R 21/18 |
| 2019/0061665 A1* | 2/2019 | Kondrad | B60N 2/14 |

FOREIGN PATENT DOCUMENTS

| | | |
|---|---|---|
| CN | 109421640 | 3/2019 |
| JP | 2007-038934 | 2/2007 |
| JP | 2014-184853 | 10/2014 |
| JP | 2016-203945 | 12/2016 |
| KR | 10-2008-0080968 | 9/2008 |
| WO | 2018/114723 | 6/2018 |

* cited by examiner

AIR-BAG APPARATUS

CROSS-REFERENCE TO RELATED APPLICATION

Priority is claimed on Japanese Patent Application No. 2019-045092, filed on Mar. 12, 2019, the contents of which are incorporated herein by reference.

BACKGROUND

Field of the Invention

The present invention relates to an air-bag apparatus.

Background

In the related art, an air-bag apparatus is known which is embedded in a vehicle seat and which expands a bag body so as to cover an upper body of an occupant when an impact is input to a vehicle and holds the occupant.

For example, Japanese Unexamined Patent Application, First Publication No. 2007-38934 discloses a configuration which has a support portion that protects an upper head part of an occupant seated on a vehicle seat when a vehicle rollover occurs and which includes an air-bag that is inflated and expanded to the support portion at the time of a rollover.

SUMMARY

The air-bag apparatus is often provided on a vehicle body portion that is arranged around the seat. For example, the air-bag apparatus is embedded in a steering wheel that is provided in front of a driver's seat in a vehicle travel direction, in a console that is provided in front of a passenger seat in the vehicle travel direction, in a side door, an upper ceiling, and the like. Such an air-bag apparatus receives the body of the occupant by a bag body that is inflated and expanded from the steering wheel, the console, the door, the ceiling, and the like in the event of a vehicle collision.

However, when a seat back of the vehicle seat is reclined or when an occupant seated on a seat of which the direction can be changed changes the seat in a direction different from a frontward direction, there may be cases in which the body of the occupant cannot be sufficiently received by the bag body that is inflated and expanded from the steering wheel, the console, the door, the ceiling, and the like.

An object of an aspect of the present invention is to provide an air-bag apparatus capable of mitigating the impact applied on an occupant regardless of a reclining state of a seat or a direction of the seat.

(1) An air-bag apparatus according to an aspect of the present invention includes: a frame member that is tiltable along a seat back of a vehicle seat; and a bag body that is embedded in the frame member, that is inflated and expanded to a front of an occupant seated on the vehicle seat at a time of an impact input, and that prevents a body of the occupant from being separated from the seat back.

(2) In the air-bag apparatus according to the above aspect (1), the frame member may include a pair of side frames each of which extends upward from each of both sides in a width direction of the seat back, and an upper frame that has an arch shape, that connects the pair of side frames, and that is provided so as to surround an upper part above a head rest of the vehicle seat.

(3) In the air-bag apparatus according to the above aspect (1) or (2), the bag body may include a pair of front extension parts each of which extends frontward from each of both sides in a width direction of the seat back, and a front bag that is provided continuously to the front extension part, that is expanded to a frontward side of the occupant seated on the vehicle seat, and that comes into contact with an upper part of the body of the occupant.

(4) In the air-bag apparatus according to the above aspect (3), each of the pair of front extension parts may be expanded to each of both sides in the width direction of the vehicle seat so as to interpose a head part of the occupant, and may be arranged along a front surface and a side surface of the head part.

(5) In the air-bag apparatus according to any one of the above aspects (1) to (4), the frame member may be provided behind the occupant seated on the vehicle seat.

(6) In the air-bag apparatus according to any one of the above aspects (1) to (5), the frame member may be provided pivotally around an axis that is parallel to a reclining shaft that reclines the seat back.

(7) The air-bag apparatus according to the above aspect (6) may further include: a drive source that swings the frame member around the axis that is parallel to the reclining shaft; a detection part that detects a posture of the occupant seated on the vehicle seat; and a controller that swings the frame member by the drive source based on the posture of the occupant detected by the detection part.

According to the above aspect (1), the bag body that is inflated and expanded at the time of the impact input is embedded in the frame member that is tiltable along the seat back. Accordingly, even if the occupant seated on the vehicle seat tilts and reclines the seat back or changes the direction of the vehicle seat itself, the body (including the head part) of the occupant can be received by the bag body that is inflated and expanded from the frame member. Since the bag body prevents the body of the occupant from being separated from the seat back, it is possible to prevent the body of the occupant displaced by the input impact from hitting an in-vehicle constituent member and another bag body that are provided in the displacement direction. Accordingly, it is possible to mitigate the impact applied on the occupant regardless of the reclining state of the vehicle seat or the direction of the vehicle seat.

According to the above aspect (2), the frame member includes the pair of side frames and the upper frame having an arch shape. Such frames can be formed to surround the seat back of the vehicle seat and an outer periphery part of the head rest provided on the seat back. Further, the bag body inflated and expanded from such a frame member can effectively receive the body of the occupant. Furthermore, the strength of such a frame member itself can also protect the occupant.

According to the above aspect (3), the front bag that is provided continuously to the pair of front extension parts each of which extends in the vehicle frontward direction from each of both sides in the width direction of the seat back expands to the vehicle frontward side of the occupant seated on the vehicle seat. Thereby, it is possible to reduce the amount of a frontward movement of the body of the occupant.

According to the above aspect (4), the pair of front extension parts are arranged along the front surface and side surface of the head part of the occupant, and thereby, it is possible to reduce the amount of a frontward movement of the head part of the occupant. Thereby, it is possible to prevent the head part of the occupant from hitting an in-vehicle constituent member or the like that is provided in the frontward direction.

According to the above aspect (5), the frame member is provided behind the occupant seated on the vehicle seat. Thereby, the bag body that is inflated and expanded frontward at the time of the impact input can effectively prevent at least an upper part of the body of the occupant from being separated frontward from the seat back.

According to the above aspect (6), the frame member is provided pivotably around the axis that is parallel to the swing axis of the seat back. Thereby, regardless of the reclining state of the seat back, the bag body that is inflated and expanded from the frame member can effectively cover the front of the occupant and further reliably prevent at least the upper part of the body of the occupant from being separated frontward from the seat back.

According to the above aspect (7), the frame member is driven to swing around the axis that is parallel to the reclining shaft by the drive source. The controller can swing the frame member based on the posture of the occupant detected by the detection part and allow the frame member to follow the posture of the occupant. Thereby, it is possible to allow the bag body to be inflated and expanded in accordance with the posture of the occupant, and it is possible to effectively protect the occupant.

DESCRIPTION OF EMBODIMENTS

Figure 1:
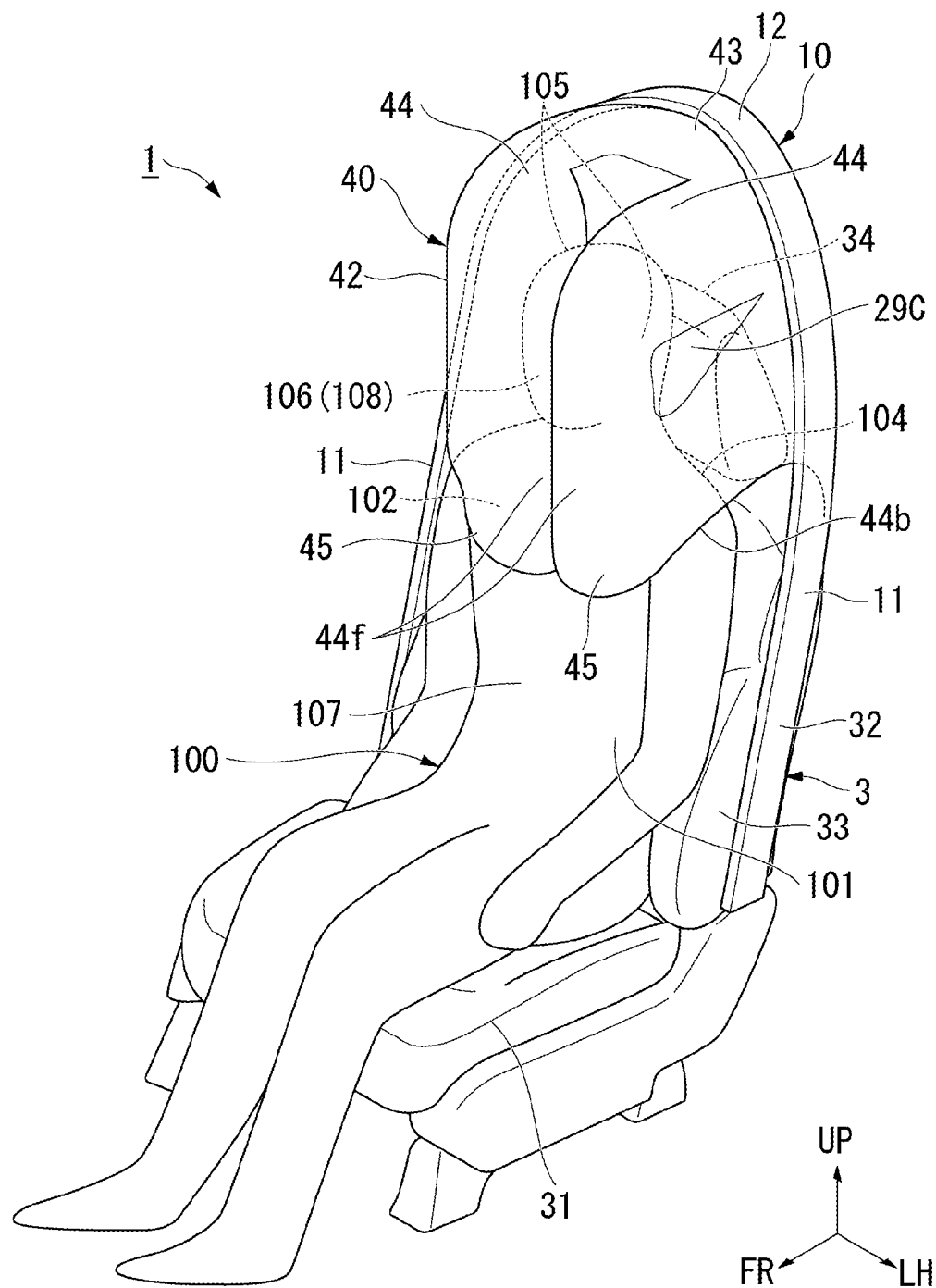
FIG. 1 is a view showing a vehicle seat in which an air-bag apparatus according to an embodiment of the present invention is mounted and is a perspective view showing a state in which the air-bag apparatus is expanded.

Hereinafter, embodiments of the present invention will be described with reference to the drawings. In the drawings used below, an arrow FR indicates a frontward direction of a vehicle, an arrow UP indicates an upward direction of the vehicle, and an arrow LH indicates a leftward direction of the vehicle.

Figure 2:
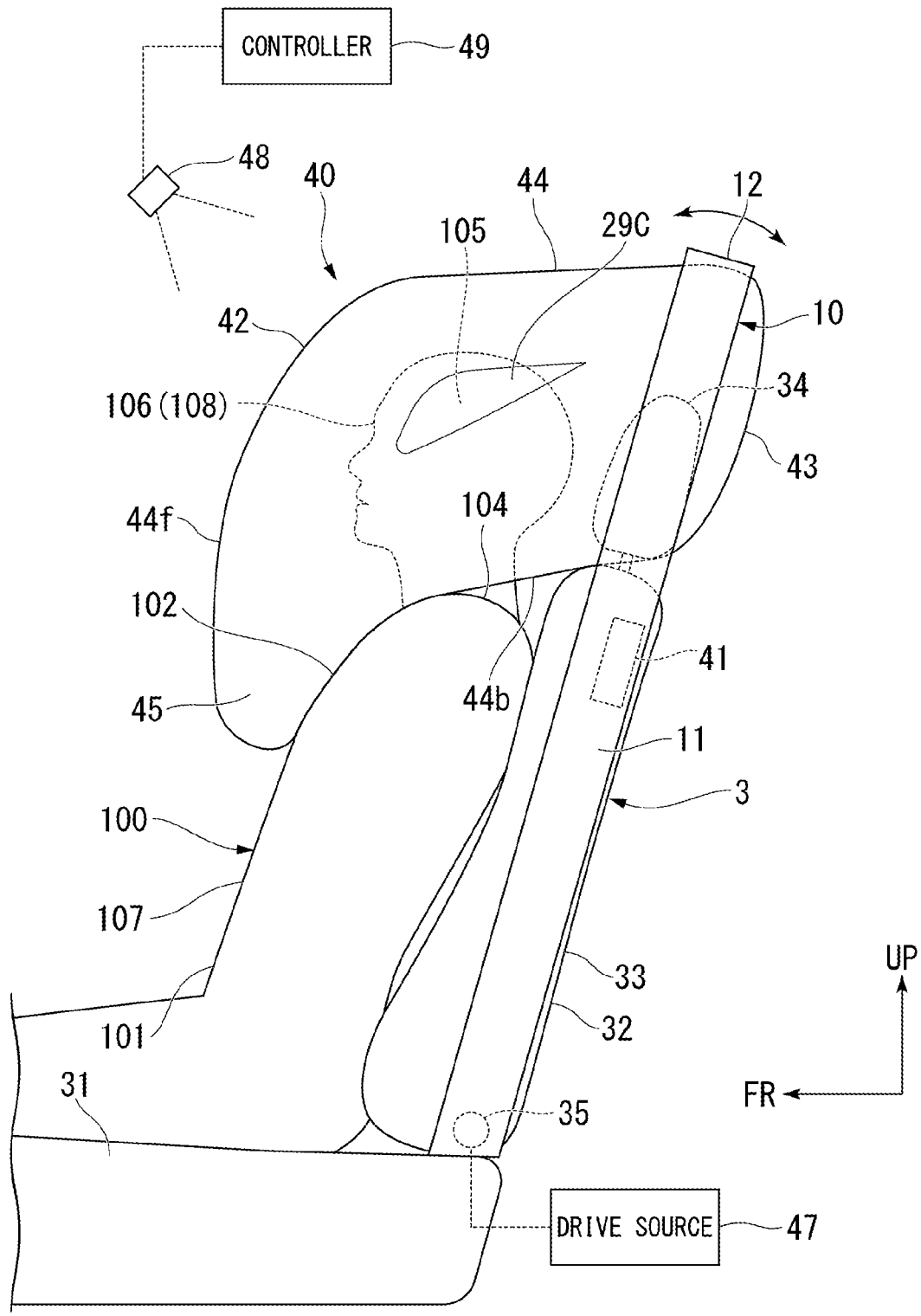
FIG. 2 is a side view showing a state in which the air-bag apparatus is expanded.
Figure 3:
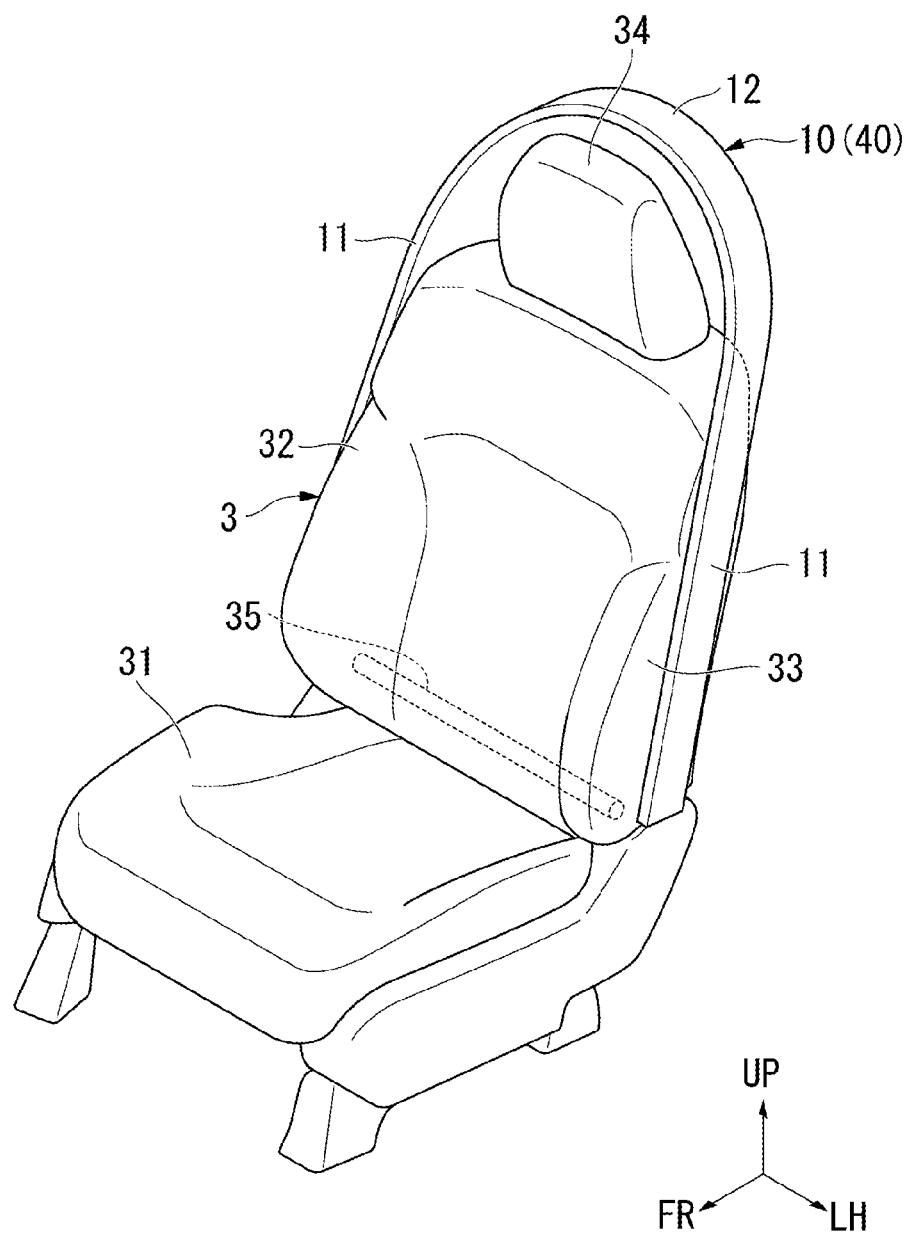
FIG. 3 is a perspective view showing the vehicle seat in which the air-bag apparatus is mounted.

FIG. 1 is a view showing a vehicle seat in which an air-bag apparatus according to an embodiment of the present invention is mounted and is a perspective view showing a state in which the air-bag apparatus is expanded. FIG. 2 is a side view showing a state in which the air-bag apparatus is expanded. FIG. 3 is a perspective view showing the vehicle seat in which the air-bag apparatus is mounted.

As shown in FIG. 1 to FIG. 3, a vehicle 1 includes an air-bag apparatus 40 inside a vehicle room. The air-bag apparatus 40 is provided integrally with a vehicle seat 3.

As shown in FIG. 3, the vehicle seat 3 is provided as, for example, a driver's seat, a passenger seat, a rear seat, or the like. The vehicle seat 3 includes a seat cushion 31 that supports buttocks of the occupant and a seat back 32 that is connected to a rear end part of the seat cushion 31 and that supports an upper body (a body, a neck part, and a head part) of the occupant.

The seat cushion 31 includes a frame (not shown) that forms a skeleton of the seat cushion 31, a pad material (not shown) that is formed of, for example, a urethane foam or the like and that is mounted on the frame, and a cover (not shown) that is formed of, for example, a synthetic fiber, a leather, or the like and that covers the frame and the pad material. The seat cushion 31 is fixed to a floor surface inside the vehicle room of the vehicle 1.

The seat cushion 31 and the vehicle seat 3 may be provided rotatably around a vertical axis relative to the floor surface. That is, the vehicle seat 3 may be horizontally rotatable from a posture directed frontward in which a seater is seated facing a vehicle forward direction to a posture directed in a predetermined direction in which the seater is seated facing a vehicle side direction or a vehicle rearward direction. In this case, the vehicle seat 3 can horizontally change the direction of the occupant seated on the vehicle seat 3 inside the vehicle room, and the rotation can be locked in an arbitrary direction.

The seat back 32 includes a seat back main body 33 that stands upward from a rear end part of the seat cushion 31 and that supports a body 101 (for example, a waist part and a back part) of an occupant 100 and a head rest 34 that is attached to an upper end part of the seat back main body 33 and that supports, for example, a head part 108 of the occupant 100. The seat back 32 is formed of a frame, a pad material, and a cover as well as the seat cushion 31. The seat back main body 33 and the head rest 34 may be integrally formed.

The seat back 32 is connected to a rear end part of the seat cushion 31 to be tiltable around a reclining shaft 35 that extends in a right-to-left direction. A tilt angle of the tiltable seat back 32 can be held to a plurality of stages by a locking portion (not shown) that includes a pin or the like.

A specific configuration for tilting the seat back 32 may be arbitrary as long as a required function can be realized.

As shown in FIG. 1 and FIG. 2, the air-bag apparatus 40 holds the upper part of the upper body of the occupant at the time of operation. The air-bag apparatus 40 includes a frame member 10, an inflator 41 (refer to FIG. 2), and a bag body 42.

The frame member 10 is integrally provided on at least an upper part of the seat back 32 of the vehicle seat 3. The frame member 10 includes a pair of right and left side frames 11 and an upper frame 12 in an integrated manner. Each of the pair of side frames 11 is provided to extend upward from each of both sides in a width direction of the seat back 32. The upper frame 12 is provided in an arch shape that defines an inverted U shape so as to connect upper end parts of the pair of side frames 11 and surround an upper part above the head rest 34 of the vehicle seat 3. Such a frame member 10 is provided behind the occupant 100 seated on the vehicle seat 3.

The frame member 10 is tiltable along the seat back 32. The frame member 10 is tiltable so as to stand or fall in a front-to-rear direction and a vertical direction similarly to a tilt movement of the seat back 32. For example, the pair of side frames 11 that constitute the frame member 10 is provided swingable around the same axis as the reclining shaft 35 that reclines the seat back 32.

Here, the phrase "swingable around the same axis as the reclining shaft 35" includes a configuration in which the frame member 10 is arranged coaxially with the reclining shaft 35 but is supported by a rotation shaft as a separate body in addition to a configuration in which the frame member 10 is supported by the reclining shaft 35 itself. Further, the "rotation shaft as a separate body" may be parallel to the reclining shaft 35 but be arranged at a separate axis. The rotation shaft is provided, for example, on a side surface of the seat back 32.

The tilt movement of the frame member 10 is not limited to a swing (rotation) around an axis, and the frame member 10 may be inclined through a link mechanism or the like. For example, in a case where the vehicle seat 3 is horizontally rotated to change the direction of a seat front-to-rear direction, accordingly, the direction of a frame front-to-rear direction is changed, and a state where the seat front-to-rear direction and the frame front-to-rear direction are matched with each other is maintained.

In the present embodiment, the frame member 10 is driven to swing around the same axis as the reclining shaft 35 by a drive source 47 such as a motor. The air-bag apparatus 40 includes a detection part 48 (refer to FIG. 2) such as a sensor or a camera that detects the posture or the like of the occupant seated on the vehicle seat 3 inside the vehicle room. A controller 49 of the air-bag apparatus 40 allows, by the drive source 47, to swing the frame member 10 on the basis of the posture of the occupant 100 detected by the detection part 48 and follow the posture of the occupant. For example, when the occupant 100 is seated on the seat cushion 31 shallowly (such that the buttocks are displaced to the front of the seat cushion 31), the frame member 10 is tilted frontward. When the occupant 100 is seated on the seat cushion 31 deep (such that the buttocks are displaced to the rear of the seat cushion 31), the frame member 10 is swung rearward. Thereby, the bag body 42 described below is moved in accordance with the posture of the occupant 100, and it is possible to inflate and expand the bag body 42 at a prescribed position relative to the occupant 100.

A configuration may be employed in which the pair of side frames 11 of the frame member 10 are fixed to both sides in the width direction of the seat back 32 to allow the frame member 10 to be swingable integrally with the seat back 32. The pair of side frames 11 of frame member 10 may be formed of a design that is integrated to both sides in the width direction of seat back 32.

The inflator 41 generates a high-pressure gas at the time of an impact input to the vehicle. The inflator 41 is embedded in the frame member 10.

The bag body 42 is accommodated inside the frame member 10, for example, in a folded state or a wound state and is inflated and expanded from the frame member 10 upon supply of the gas from the inflator 41. The bag body 42 is formed of a single base fabric or a plurality of base fabrics sewn together in a sack shape. The following description regarding the bag body 42 describes a state in which the expansion of the bag body 42 has been completed unless otherwise stated.

The bag body 42 is expanded from the inside of the frame member 10 through a prescribed opening or the like. The bag body 42 includes a rear bag 43, a pair of front extension parts 44, and a pair of front bags 45.

The rear bag 43 stands further upward than an upper end of the head rest 34 inside the upper frame 12 of the frame member 10. The rear bag 43 is formed such that a width size in the right-to-left direction is larger than a width size of the head rest 34.

Each of the pair of front extension parts 44 extends from each of both sides in the width direction of the rear bag 43 toward the seat frontward direction. The pair of front extension parts 44 is provided such that a spacing in the right-to-left direction is gradually reduced toward a frontward direction. That is, each of the front extension parts 44 extends obliquely frontward so as to approach a center side in the width direction of the seat back main body 33 from a side in the width direction of the rear bag 43. Thereby, the bag body 42 defines a substantially triangular shape in a plan view. Here, front end parts 44f of the pair of front extension parts 44 may be connected to each other.

The pair of front extension parts 44 expands so as to cover a front surface 106 and a side surface 105 of the head part 108 of the occupant 100. A lower end part 44b of the front extension part 44 expands so as to cover an upper surface of a shoulder part 104 of the body 101 of the occupant 100.

The pair of front bags 45 are provided to extend downward from the front end parts 44f of the pair of front extension parts 44. The front bag 45 is formed continuously to a lower side of the front end part 44f of the front extension part 44. The front bag 45 communicates with the front extension part 44. The front bag 45 expands to a frontward side of the occupant 100 seated on the vehicle seat 3 and comes into contact with only an upper part 102 of a front surface of the body 101 of the occupant 100. Specifically, the front bag 45 is provided to come into contact with a clavicle of the body 101 and a plurality of ribs from the top of the rib (for example, from a top rib to a second rib). A lower part of the front bag 45 terminates, for example, at a height of a second rib from the above and does not come into contact with a region (a lower part 107 of the front surface of the body 101) of third and subsequent ribs from the above. Thereby, the strength of the force for holding the occupant is relatively changed in the vertical direction of the front bag 45.

A tether (not shown) having a band shape is provided inside the bag body 42 such that the rear bag 43, the front extension part 44, and the front bag 45 are expanded as described above.

A non-expansion part 29C that is formed such that the opposing base fabrics of the bag body are sewn together and that does not inflate at the time of expansion is formed on the front extension part 44. The front extension part 44 expands annularly to surround the non-expansion part 29C by forming the non-expansion part 29C.

The inflator 41 supplies the gas in the bag body 42 inside the rear bag 43. The bag body 42 is provided such that the rear bag 43, the front extension part 44, and the front bag 45 are inflated and expanded in this order when the gas is supplied from the inflator 41.

Hereinafter, the operation of the air-bag apparatus 40 will be described.

When an impact is input to the vehicle, the inflator 41 of the air-bag apparatus 40 generates a high-pressure gas. When the gas is generated from the inflator 41, the rear bag 43 is inflated and expanded first upon supply of the gas. When the rear bag 43 is inflated and expanded, the gas is supplied from both sides in the width direction of the rear bag 43 to the pair of front extension parts 44, and the pair of front extension parts 44 are inflated and expanded.

Then, the gas is supplied to the front bag 45 from the pair of front extension parts 44. Thereby, the front bag 45 is inflated and expanded in front of the upper part 102 of the body 101 of the occupant 100.

Accordingly, the operation of the air-bag apparatus 40 is completed.

The air-bag apparatus 40 includes the frame member 10 that is provided integrally with the seat back 32 and allows the bag body 42 to be inflated and expanded from the frame member 10, and thereby, even when the body of the occupant 100 is displaced relative to the vehicle body at the time of reclining the vehicle seat 3 or at the time of horizontal rotation of the vehicle seat 3, it is possible to inflate and expand the bag body 42 at an appropriate position relative to the occupant 100. Further, by allowing the frame member 10 to follow the posture of the occupant using the detection part 48, it is possible to reliably arrange the frame member 10 at an appropriate position relative to the occupant 100.

As described above, in the above embodiment, the bag body 42 that is inflated and expanded at the time of the impact input is embedded in the frame member 10 that is tiltable along the seat back 32. Accordingly, even if the occupant 100 seated on the vehicle seat 3 tilts and reclines the seat back 32 or changes the direction of the vehicle seat 3 itself, at least the upper part 102 of the body 101 of the occupant 100 can be received by the bag body 42 that is inflated and expanded from the frame member 10. Further, since the bag body 42 prevents at least the upper part 102 of the body 101 of the occupant 100 from being separated frontward from the seat back 32, it is possible to prevent part of the body of the occupant 100 displaced by the input impact from hitting an in-vehicle constituent member and a bag body of another air-bag apparatus that are provided at a frontward position in the displacement direction. Accordingly, it is possible to mitigate the impact applied on the occupant regardless of the direction of the seat or the reclining state of the vehicle seat 3 inside the vehicle room.

Further, the frame member 10 includes the pair of side frames 11 and the upper frame 12 having an arch shape. Such frames can be formed to surround the seat back 32 of the vehicle seat 3 and an outer periphery part of the head rest 34 provided on the seat back 32. Further, the bag body 42 inflated and expanded from such a frame member 10 can effectively receive at least the upper part 102 of the body 101 of the occupant 100. Furthermore, it is also possible to protect the occupant 100 by the strength of such a frame member 10 itself.

Further, the front bag 45 that is provided continuously to the pair of front extension parts 44 each of which extends in the vehicle frontward direction from each of both sides in the width direction of the seat back 32 expands to the vehicle frontward side of the occupant 100 seated on the vehicle seat 3. Thereby, it is possible to reduce the amount of a frontward movement of the body 101 of the occupant 100. Further, the front bag 45 comes into contact with the upper part 102 on the front surface of the body 101 of the occupant 100. The upper part 102 of the body 101 of the occupant 100, that is, for example, the clavicle or a part, for example, from the top of the rib to several ribs is resistant to a load applied from the front as compared to a lower part than the several ribs. Since the front bag 45 comes into contact with the upper part 102 on the front surface of the body 101 which is resistant to the load as described above, it is possible to mitigate the impact which is received by the occupant 100 even if the body 101 of the occupant 100 is displaced to swing frontward and hits the bag body 42 at the time of collision.

Further, the pair of front extension parts 44 are arranged along the front surface 106 and side surface 105 of the head part 108 of the occupant 100, and thereby, it is possible to reduce the amount of a frontward movement of the head part 108 of the occupant 100. Thereby, it is possible to prevent the head part 108 of the occupant 100 from hitting an in-vehicle constituent member or the like that is provided in the frontward direction.

Further, the frame member 10 is provided behind the occupant 100 seated on the vehicle seat 3. Thereby, the bag body 42 that is inflated and expanded frontward at the time of the impact input can effectively prevent at least the upper part 102 of the body 101 of the occupant 100 from being separated frontward from the seat back 32.

Further, the frame member 10 is provided pivotally around the same axis as the reclining shaft 35 of the seat back 32. Thereby, regardless of the reclining state of the seat back 32, the bag body 42 that is inflated and expanded from the frame member 10 can effectively cover the front of the occupant 100 and further reliably prevent at least the upper part 102 of the body 101 of the occupant 100 from being separated frontward from the seat back 32.

Further, the frame member 10 is driven pivotally around the same axis as the reclining shaft 35 by the drive source 47. The controller 49 swings the frame member 10 on the basis of the posture of the occupant 100 detected by the sensor or camera 48 and allows the frame member 10 to follow the posture of the occupant 100. Thereby, it is possible to allow the bag body 42 to be inflated and expanded in accordance with the posture of the occupant 100, and it is possible to effectively protect the occupant 100.

Modified Example of Embodiment

Figure 4:
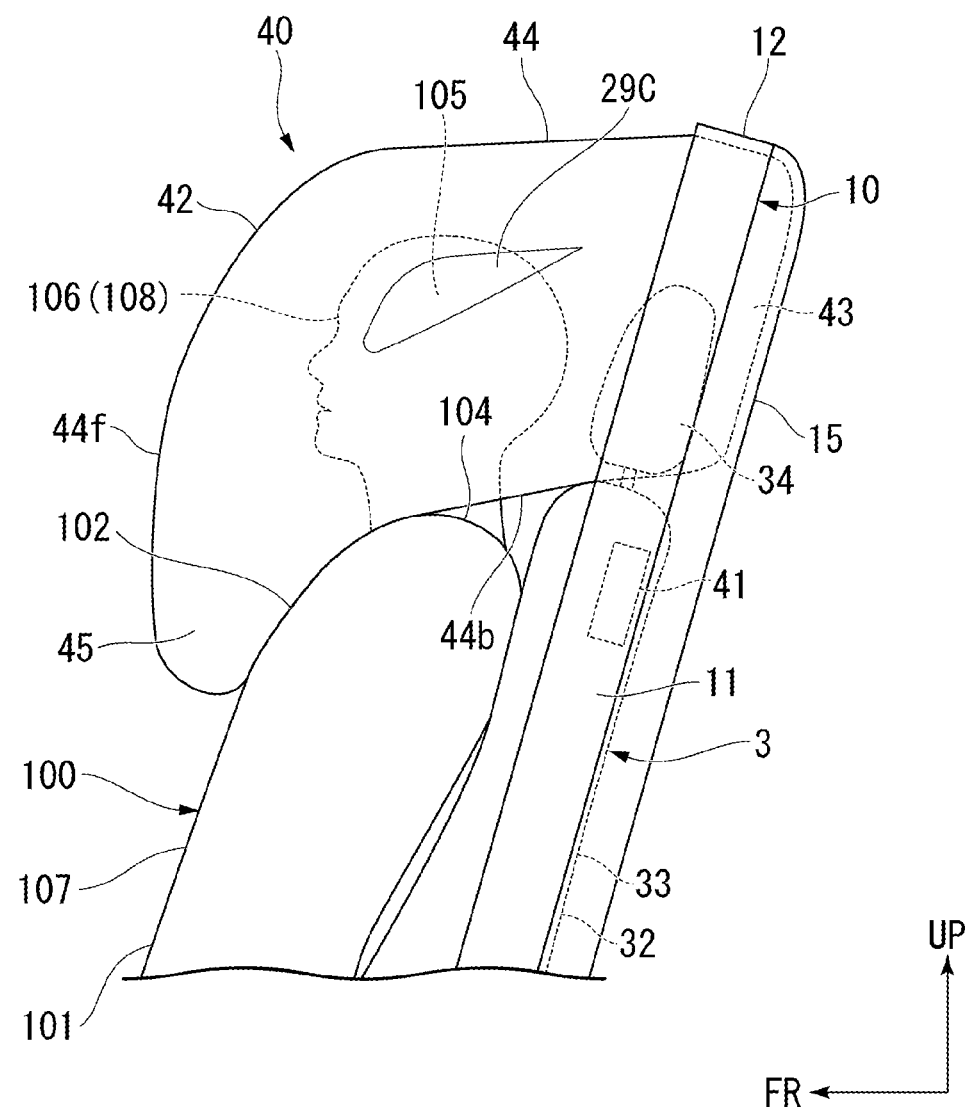
FIG. 4 is a view showing a vehicle seat in which an air-bag apparatus according to a modified example of the present embodiment is mounted and is a side view showing a state in which the air-bag apparatus is expanded.

FIG. 4 is a view showing a vehicle seat in which an air-bag apparatus according to a modified example of the present embodiment is mounted and is a side view showing a state in which the air-bag apparatus is expanded.

As shown in FIG. 4, the frame member 10 may integrally include a seat back 32 and a rear cover part 15 that covers the rear of the head rest 34 provided on the seat back 32. In other words, the frame member 10 may be provided on a portion of the rear cover part 15.

According to such a configuration, a part of the occupant 100 that cannot be surrounded by the rear cover part 15 can be surrounded by the bag body 42. Thereby, it is possible to effectively protect the upper body of the occupant 100 seated on the vehicle seat 3 by the rear cover part 15 and the bag body 42 that is inflated and expanded frontward from the frame member 10.

The present invention is not limited to the above embodiments described with reference to the drawings, and various modified examples can be conceivable within the technical scope of the invention.

For example, in the above embodiments, the air-bag apparatus 40 includes the rear bag 43, the pair of front extension parts 44, and the front bag 45; however, as long as the occupant 100 can be effectively protected, the shape and configuration of the air-bag apparatus 40 can be appropriately changed.

The configurations in the above embodiments are examples of the present invention and can be variously changed without departing from the scope of the present invention.

What is claimed is:

1. An air-bag apparatus comprising:
   a frame member that is tiltable along a seat back of a vehicle seat; and
   a bag body that is embedded in the frame member and that is inflated and is configured to expand to a front of an occupant seated on the vehicle seat at a time of an impact input,
   wherein the frame member is located so as to cover a rear of the seat back and an upside of the seat back at the time of the impact input, and
   the frame member is swingable around the same axis as a reclining shaft of the vehicle seat.

2. The air-bag apparatus according to claim 1,
   wherein the frame member comprises
   a pair of side frames each of which extends upward from each of both sides in a width direction of the seat back, and an upper frame that has an arch shape, that connects the pair of side frames, and that is provided so as to surround an upper part above a head rest of the vehicle seat.

3. The air-bag apparatus according to claim 1,
wherein the bag body comprises
a pair of front extension parts each of which extends frontward from each of both sides in a width direction of the seat back, and
a front bag that is provided continuously to the front extension part, that is configured to expand to a frontward side of the occupant seated on the vehicle seat, and that is configured to come into contact with an upper part of the body of the occupant.

4. The air-bag apparatus according to claim 3,
wherein each of the pair of front extension parts is configured to expand to each of both sides in the width direction of the vehicle seat so as to be configured to interpose a head part of the occupant and is arranged along a front surface and a side surface of the head part.

5. An air-bag apparatus comprising:
a frame member that is tiltable along a seat back of a vehicle seat;
a bag body that is embedded in the frame member and that is inflated and is configured to expand to a front of an occupant seated on the vehicle seat at a time of an impact input;
a drive source that swings the frame member around an axis that is parallel to a reclining shaft;
a detection part that is configured to detect a posture of the occupant seated on the vehicle seat; and
a controller that swings the frame member by the drive source based on the posture of the occupant detected by the detection part,
wherein the frame member is located so as to cover a rear of the seat back and an upside of the seat back at the time of the impact input.

6. An air-bag apparatus comprising:
a frame member that is provided along a seat back of a vehicle seat to be swingable around an axis which is parallel to a reclining shaft that reclines the seat back;
a bag body that is embedded in the frame member and that is capable of being inflated and configured to expand to a front of an occupant seated on the vehicle seat at a time of an impact input;
a drive source that swings the frame member around an axis that is parallel to the reclining shaft;
a detection part that is configured to detect a posture of the occupant seated on the vehicle seat; and
a controller that swings the frame member by the drive source based on the posture of the occupant detected by the detection part.

* * * * *